(12) United States Patent
Hankins

(10) Patent No.: US 6,375,077 B1
(45) Date of Patent: Apr. 23, 2002

(54) SYSTEM FOR ADVISING A USER WHEN SELECTING A PRODUCT

(76) Inventor: Timothy Glyn Hankins, 18 Copperkins Lane, Amersham (GB)

( * ) Notice: Subject to any disclaimer, the term of this patent is extended or adjusted under 35 U.S.C. 154(b) by 0 days.

(21) Appl. No.: 09/194,854
(22) PCT Filed: Apr. 29, 1997
(86) PCT No.: PCT/GB97/01169
  § 371 Date: Dec. 2, 1998
  § 102(e) Date: Dec. 2, 1998
(87) PCT Pub. No.: WO97/46960
  PCT Pub. Date: Dec. 11, 1997

(30) Foreign Application Priority Data

Jun. 6, 1996 (GB) ............................................... 9611788
Jan. 29, 1997 (GB) ............................................... 9701808

(51) Int. Cl.[7] ................................................. G06K 7/10
(52) U.S. Cl. ........................... 235/462.45; 235/472.01; 235/375
(58) Field of Search ............................. 235/375, 380, 235/492, 462.13, 462.45, 462.44, 472.01

(56) References Cited

U.S. PATENT DOCUMENTS

| | | | |
|---|---|---|---|
| 4,002,886 A | * 1/1977 | Sundelin | 235/462.01 |
| 4,429,385 A | 1/1984 | Cichelli et al. | 370/92 |
| 4,521,677 A | * 6/1985 | Sarvin | 235/385 |
| 4,780,599 A | 10/1988 | Baus | 235/383 |
| 4,930,011 A | * 5/1990 | Kiewit | 358/84 |
| 5,233,520 A | * 8/1993 | Kretsch et al. | 364/413.29 |
| 5,478,989 A | 12/1995 | Shepley | 235/375 |

FOREIGN PATENT DOCUMENTS

| | | |
|---|---|---|
| EP | 84108233.2 | 7/1984 |
| EP | 87308403.2 | 9/1987 |
| EP | 94111810.1 | 7/1994 |
| FR | 93 02721 | 3/1993 |
| GB | 8215786 | 5/1982 |
| GB | 9413282.6 | 9/1990 |
| WO | PCT/US95/03352 | 3/1995 |

* cited by examiner

Primary Examiner—Karl D. Frech
Assistant Examiner—Daniel St. Cyr
(74) Attorney, Agent, or Firm—Thomas, Kayden, Horstemeyer & Risley LLP

(57) ABSTRACT

A product selection system for advising a user whether or not to purchase a product such as a food product includes a product database (200) comprising data on a plurality of products, a hand-held barcode reader (106) for identifying a product, and processing means (206) for identifying whether the product has one or more user selected characteristics of the product. The characteristics may include the method of treatment or manufacture of the product, distance the product has travelled from origin, place of origin, politics of the region of origin, type of labour used in manufacture or production, details of the manufacturer or supplier, health risks, public health warnings associated with the product, special offers and the like.

32 Claims, 9 Drawing Sheets

|||||||||||
5 0 1 2 3 4 5 5 5 5 5 9

Pack Barcode

→ SCAN provides unique 'item' product code

Database (in scanner memory)

501234555555,   (A), Q, W, 500

509999912345,   B,D, 1000

Where
A-Z = 'Allergic' Ingredients

500 = Calorific Value

Screen on Scanner

| "NUT ALLERGY" NO PURCHASED ADVISED |
|---|

Because User has previously entered

A = NUT on entry prompt to system.

*Fig.2*

SYSTEM FOR ADVISING A USER WHEN SELECTING A PRODUCT

The present invention relates to a product selection system for use, for example, in supermarkets and the like.

Supermarket customers are today presented with an enormous range of different food products. For many of the products on sale, such as fresh vegetables, fish, and meat, the content and nature of the food is obvious and easy to identify. If a person is allergic or simply wishes to avoid these types of foods, this can be done easily.

Many food producers now include a nutritional information table on the packaging, in anticipation of a legal requirement or for commercial reasons. All the tables contain four basic items of information The first is normally the number of calories in each 100 g portion, followed by the amount of fat, the amount of protein and the amount of carbohydrate. Since each figure is provided in grams per 100 g portion, the customer can compare the figures directly with other products. The nutritional information provided can then be used by customers to count the calories they are buying for dieting or for medical conditions, and/or reduce their intake of individual items such as saturated fat or salt.

Systems are known for informing a user of the ingredient content of a product. However, prior art systems are either limited in their use by being limited to the information given to the user or may be expensive, bulky or impractical due to the amount of memory space required to store information on many products.

U.S. Pat. No. 5,478,989 discloses a system for generating personalised nutritional information which includes means for inputting personal data relating to an individual, a barcode reader for inputting data identifying at least one food product, a processor for correlating the personal data with prestored nutritional data pertinent to the food product, and means for outputting information to the person based on the correlation. The prestored nutritional data may include information relating to allergy warnings pesticide levels and the names of individual stores which carry the foods.

U.S. Pat. No. 4,780,599 discloses the use of a hand-held bar code reading device to retrieve product information for users. FR-A-2702583 discloses the use of a hand-held barcode reader which is used to make purchasing decisions based on the price of selected products The present invention seeks to provide an improved product selection system.

According to an aspect of the present invention, there is provided a product selection system for advising a user whether or not to purchase a product, including a product database comprising product data on a plurality of products, product selection means for selecting a particular product listed in the database, user preference means for determining user preferences based on selected characteristics of the product, wherein the product data includes predetermined characteristics of each product, one or more of said characteristics being unrelated to the ingredient content of a product; and data processing means operable to generate sub-database of products matching the user preferences.

In an embodiment, the product characteristics include one or more of: method of treatment or manufacture, distance product has travelled from origin, place of origin, politics of region of origin, type of labour used in manufacture or production, details of manufacturer or supplier, health risks, public health warnings associated with the product, special offers.

Preferably, the system is arranged to make a decision for a user as whether or not to purchase a selected product. The system may include means to explain to a user the reasons for the decision based upon selected product characteristics.

In the preferred embodiment, the system includes a central processing station comprising the product database and one or more mobile user devices. The or each user device is preferably hand-held.

Advantageously, the or each user device is programmable by the central processing station so as to contain a part of the product database relevant only to an identified user.

The reader may include barcode reading means for identifying a selected product from a barcode thereon. The reader may additionally or alternatively be provided with reading means for reading a product identifier other than a barcode. Such identifiers may be a code, the product name, a number or any other suitable identifier.

In an embodiment, the system includes user monitoring means for monitoring products considered for purchase by a user.

According to another aspect of the present invention, there is provided a user portable device for advising a user whether or not to purchase a product, including product identifying means for identifying a product to be tested, a database of product characteristics, means for comparing the characteristics of an identified product with user selected characteristics and means for advising a user whether or not to purchase the product on the basis of said determination, wherein the database includes only data deemed relevant for the particular user.

According to another aspect of the present invention, there is provided a method of advising a user whether or not to purchase a product, including the steps of determining user preferences by selection of one or more product characteristics, identifying a product selected by the user on the basis of a product identifier, determining whether the product includes one or more of the user selected product characteristics from a product database including one or more product characteristics unrelated to the ingredient content of a product, and notifying the user of the results of the determination and generating a sub-database of products matching user preferences.

There are customers who wish to buy these types of foods, but they may avoid the food product altogether, for political or lifestyle reasons, simply because information on the product is not readily available to them at the point of selection. Examples of these types of customers interests, amongst others, are:

Chemically treated produce,
The number of miles the food has travelled,
The politics of the country of origin,
The use of child labour,
Blacklisted companies,
Foods avoided for religious reasons,
Public health warnings, such as recent concerns over eggs and British beef,
Special offers.

In addition to these basic types of foods, there is an ever increasing number of processed and treated foods which are available today, where it is difficult for customers to identify quickly any individual concerns they may have over a product. This may be due to the fact that the information is simply not on the packaging, or it is listed by an unfamiliar name.

Food producers are obliged by law to list the ingredients of a packaged food product on the packaging of the product in descending order of weight. Since there are presently no legal requirements to list the amount of any ingredient in a product, it is difficult for people who restrict their consumption of certain ingredients to purchase these foods with any confidence. Moreover, there is no legal requirement for listing ingredients for alcoholic beverages (wine, beer etc.) which can also contain colourings and preservatives. Food additives are referred to by their E number or by chemical or common name, some of which may mean very little to the average customer.

It is also accepted that food producers will use their food packaging to sell the product, and unless there is a commercial or goodwill reason for highlighting a customer concern, such as low calorie foods, organic produce etc., it is unlikely to be placed on the packaging in a prominent position, the text is often in a small character size, and due to the different size and shapes of the packaging, the information may be difficult to find.

The present invention can cater for such situations and can thus provide a system which is more useful.

An embodiment of the present invention is described below, by way of example only, in which:

FIG. 2 is a schematic flow chart of a simple version of product selection system;

The examples of system described below are intended to use machine readable identifiers on food products and the like in order to determine predefined ingredients of the food products on a shop shelf and other aspects of the products, such as origin, method of manufacture and the like. The system is ideal for use by customers and organisations interested in identifying calorific values, potential allergic reaction, diabetic problems and so on. The preferred embodiments have been primarily designed for use at the point of selection of food products in supermarkets, where customers can find out quickly whether a food product sought to be purchased contains ingredients which may cause harm or which it is wished to avoid for lifestyle or special dietary reasons.

It will be apparent that the system could be adapted for other applications and is therefore not limited to food products.

Figure 1:
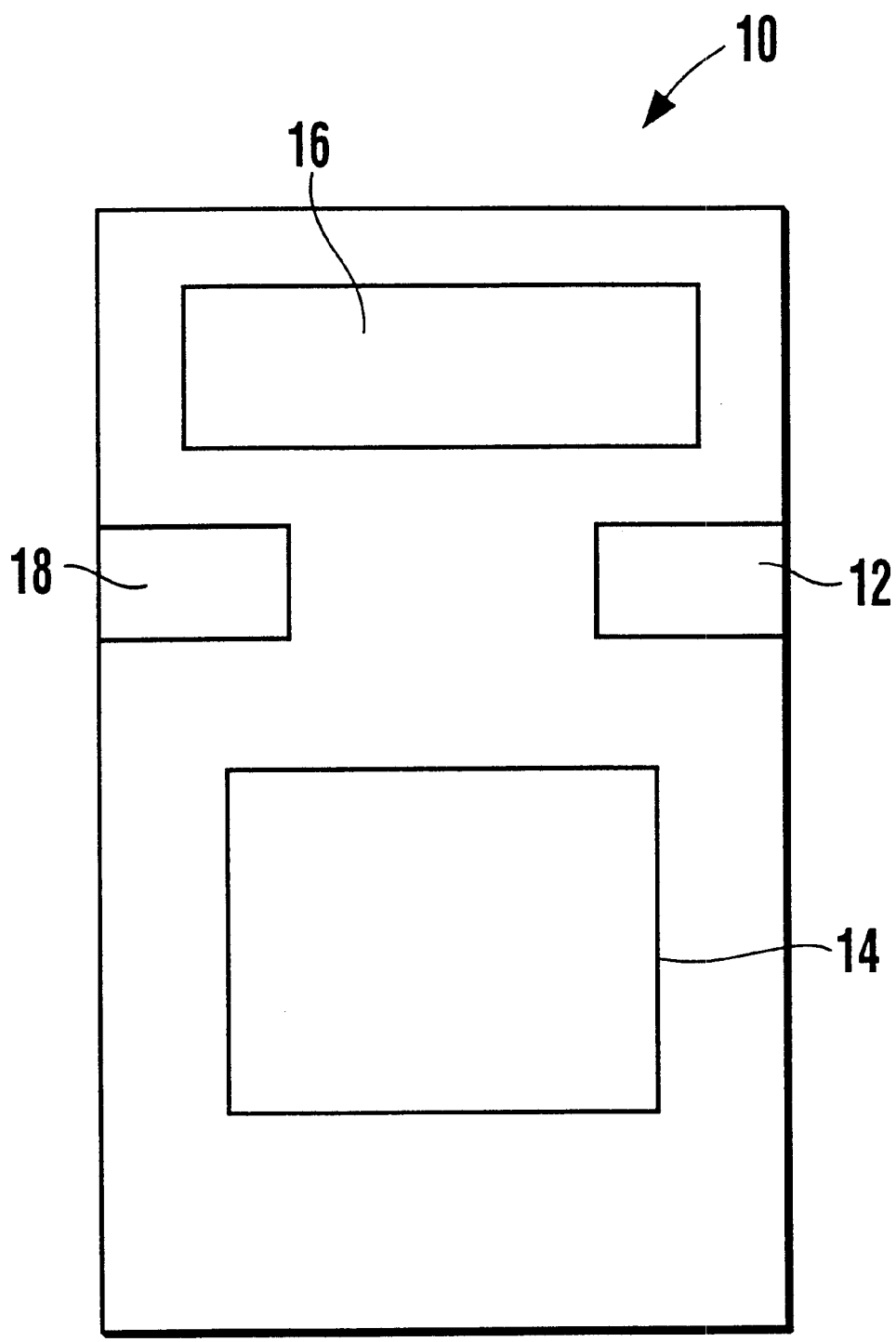
FIG. 1 is a schematic diagram of an example of hand-held scanner and database.

Referring to FIG. 1, the example of scanner and database system 10 shown is intended for use by a customer in a supermarket or the like. The system is used to determine and warn of chosen ingredients which the user should or should not consume, as is described in further detail below.

In the embodiment shown, the system 10 is designed to operate on the basis of barcodes provided on packaged foods. For this purpose, the system 10 includes a barcode scanner 12, shown only in schematic form, which is able to read the barcodes on food products under the control of a control system (not shown), such as a microprocessor. Since food products are barcoded on the basis of the European Article Numbering System, such as EAN13 and EAN8 or a derivative thereof, the actual product can be identified from the barcode, irrespective of the shop or food manufacturer.

The system includes a database (not shown) which is accessed on the basis of the barcodes. The database includes, in the preferred embodiment, a description of the product, for assisting the user, and data relating to the ingredients of the food product. The database may include all the ingredients of each product or only those most likely to be of interest to the user, such as those causing known allergies, those not suitable for people with certain illnesses such as diabetes, and those having, "unacceptable" calorific value or fat content. The ingredient data could be stored as code designators which are translated into their actual ingredients for versions where the actual ingredients are notified to the user.

The system 10 could also or in the alternative provide for ingredients which the user should consume, for example for dietary reasons. These may, for example, be iron for a user suffering from anaemia.

For either purpose, the system may be set to take into account ingredient quantities rather than just ingredient presence.

The nature and possible content of the database are described in further detail below.

The system 10 is provided with an input unit 14, which may be of any suitable form, such as an alpha/numeric key pad. A display 16 is also provided, which again may be of any suitable form such as a liquid crystal display or equivalent. The display 16 provides data input information and results of the determination of a particular food product.

Additionally or alternatively, the system 10 may include an acoustic indicator such as a loudspeaker or buzzer to inform the user of the results of its determination of a food product. Similarly, instead of displaying the results on a display such as the display 16, the system 10 may be provided with any other suitable visual indicator, such as one or more LEDs.

An example of method by which the system of FIG. 1 may operate is shown in FIG. 2. This is a simple implementation and the reader is referred to the more detailed example described below.

In summary, in the method of FIG. 2, the control and processing unit within the system decodes the barcode, looks up the appropriate database record and displays or otherwise indicates to the user, by an acoustic or visual indicator, whether it is safe or wise for the user to purchase that food product. For programming purposes, the display 16 may provide an "entry" screen which prompts the current user to identify any allergy for which the system 10 is to check, any calorific or similar parameter which the user requires and/or any other ingredient of which the user wants to be warned. In the case where the system is to be used by a plurality of users, the system can be reprogrammed by each user or the system 10 can include a memory (not shown) in which can be stored the relevant ingredient data for a plurality of users, for subsequent retrieval by means of an identification number or code.

In an alternative embodiment, data input for a user may be by means of a separate personal computer which can be linked to the system 10.

The warning given by the system 10 could be a simple yes/no warning or more specific information as to the particular food product, for example quantity of the ingredient in the product. In the embodiment shown in FIG. 2 the system 10 is designed to give a simple yes or no indication as to the existence of the ingredient in the food product tested and calorific data.

Thus, the system has inputted therein details of the user's food requirements or preferences. The user is then able to scan any product containing an EAN barcode or a derivative thereof, at which point the system's software will check the ingredient database for any condition found that has been earlier inputted by the user, and report to the user in either visible and/or audible form that the scanned product contains one or more ingredients which it is inadvisable to consume based on the pre-programmed conditions.

The software within the system 10 will advise the user of any product containing 'unacceptable' ingredients to the user and the system may be capable of printing a hard copy version of all products selected and/or the total calorific value of the products selected.

in the specific example of FIG. 2, the user has programmed into the system 10 an allergy to nuts. When the barcode of the food product having barcode 5012345555559 is scanned, the control and processing unit of system 10 accesses the database at a location equivalent to barcode 5012345555559, at which the database has ingredient codes A, Q. W and a calorific value for the product of 500 (preferably normalised to a predetermined product quantity). In this example, ingredient code A refers to nuts, so the system 10 displays on display 16 the message "Nut Allergy—No Purchase Advised".

It is envisaged that the sample system described above would be used in other applications, for example to warn the user of particular ingredients, nature or origin of a product.

It will be apparent that although the system 10 would normally be software controlled, it could be designed primarily on the basis of hardware components.

FIGS. 3 to 11 give more detailed examples, which include additional features of the preferred embodiments.

The examples described below provide a system to complement any dietary or avoidance plan by giving a customer the ability to check any individual product in a supermarket against their special interests to see if it contains ingredients or amounts which are inadvisable to purchase. It can also be used to make requests for more information on any of the products in the supermarket. This can be achieved while the customer is walking around the shop using a product identifier system such as that shown in FIG. 1.

SUMMARY OF SYSTEM OPERATION

Before using the system for the first time, the customer must be registered, for example through a loyalty scheme with the supermarket, to provide their personal details, and to identify uniquely that person. Registration is preferably by computer data input, in which the customer is provided with a number of computer screens to describe special interests such as allergy details, dietary wishes or requirements, religious dietary requirements, political preferences, food manufacturing preferences, food origin preferences and so on. Supermarket staff could, alternatively enter such data either with the customer or at a later point in time.

(i) Step 1

Once the customer has been registered, they can collect a scanner from a central location in the shop. At the central location, they will be asked to swipe or insert their account card into a magnetic strip reader, which will identify the customer from the account number on the magnetic strip of the card. Once the number is received, the main system software will download product information from a central computer to the scanner for the customer's use. Only product details which fall within the interests of that customer will be downloaded to the scanner with the account number of the customer. It will be appreciated that other methods of identifying a customer could be provided.

(ii) Step 2

The customer simply scans the barcode of the product of interest as he/she progresses through the shop. Once the barcode has been scanned, the scanner will check the product details held in its memory to see if it is listed in the customer's predefined interests. If it is not, the scanner will log that it has read the product barcode, and report to the customer that no relevant information is available. If identified, the scanner will report to the customer in either visible or audible form if it is inadvisable to purchase the product because it contains ingredient(s) which they have identified to avoid, or if the product is not desired for any other reason. The scanner is designed to explain, for example by means of scrolling text, the interest that was found and any ingredient amounts required.

(iii) Step 3

The scanner is then returned to the central location point. The scanner can then be uploaded to inform a central processing system who has returned the scanner, the list of products scanned by that person and the day's date. Once the scanner has been returned to the central system, the customer can leave or pass to a point in the shop to obtain more information on the products scanned. Supermarkets can provide this information through dedicated computers and printer, or by appending the information to receipts printed at the checkout.

Systems Overview

The following overviews introduce the preferred designs of central processing system and of programming/access methods, in terms of the connection between product components, the use of equipment and the interaction with people. The relationships are shown as the product may be used in three different implementation plans shown in FIGS. 3 to 5 inclusive.

1. Stand-alone Central Client System

Figure 3:
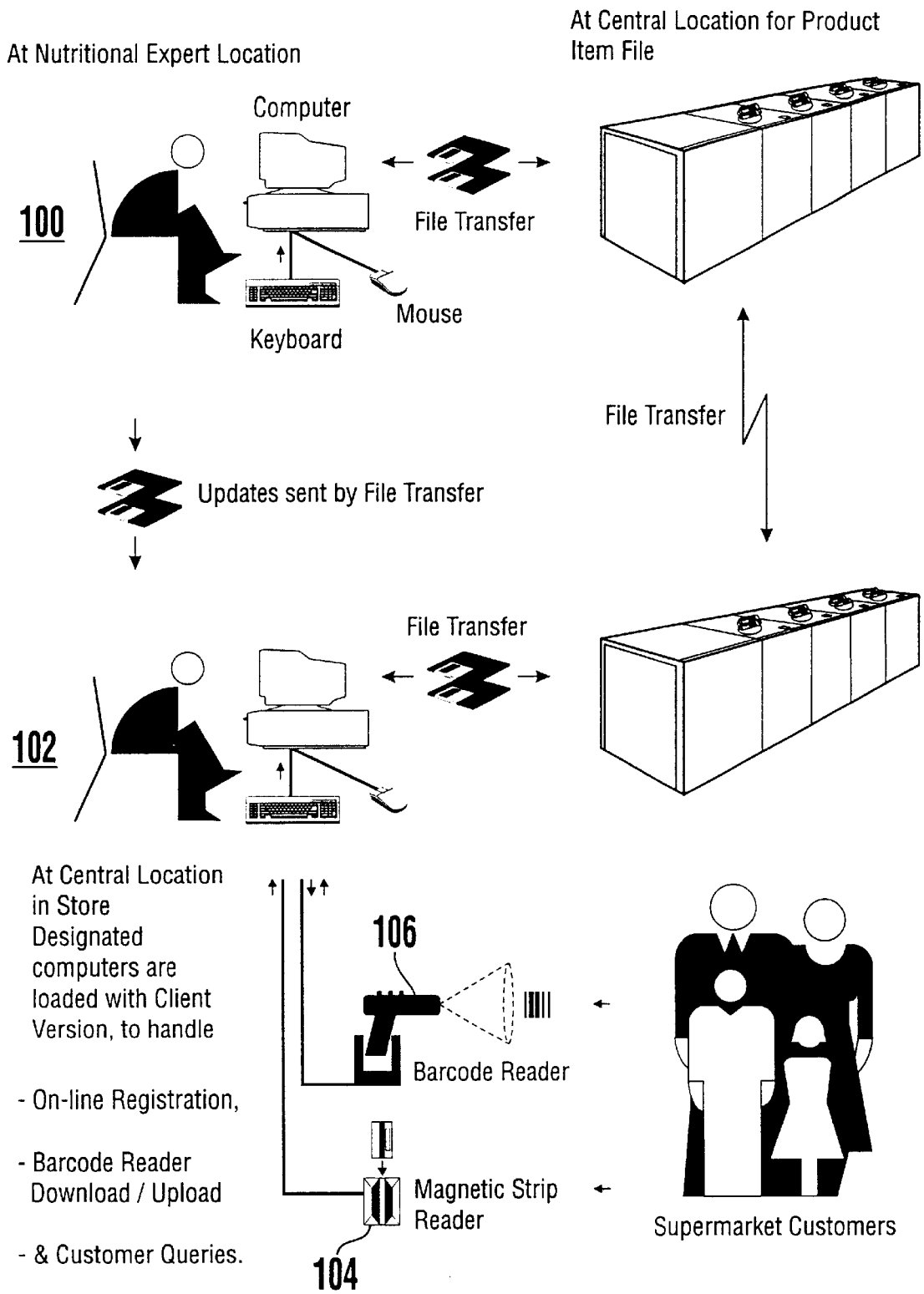
FIGS. 3 to 5 are schematic diagrams of embodiments of overall system intended for use in food supermarkets.

In the first implementation, shown in FIG. 3, the supermarket chooses to implement the system on stand-alone computer equipment, with little or no direct connection to other computer equipment or other database software. This may be because only mainframe technology is deployed in shops, with little or no PC connectivity.

At the location of the supermarket's nutritional expert, a central processing system is installed on a stand-alone computer 100. The computer 100 will have a version of the software and the computer database files required to maintain the food product details, a complete list of customer interests, the layout and design of a customer questionnaire. Communication with other computers will be made by file transfer. Although floppy diskettes are shown for file transfer, any of the other established methods of file transfer may be employed by the supermarket company. One method which may be used is transfer through existing mini-frame links between shops.

At each shop, one or more client versions 102 of the central processing system are installed in a central location on computers of a similar type to the one used by the nutritional experts. In addition to the use of the keyboard and pointing devices used by the nutritional expert, the client version supports the use of magnetic strip readers for customer account cards or loyalty cards, and connection to mounted barcode readers.

At both the location of the nutritional expert, and the central location in a shop, supermarket staff can modify the set-up of the software, and view or edit the database information through a series of visual display screens in the client version 102. Access to these screens may be restricted by password, and the use of a keyboard. Supermarket staff can then address queries made by customers and edit their customer interests immediately.

Alternatively, when a customer enters the shop and swipes their customer account card through one of the readers 104 in a shop, a visual display and pointing device can be used to select their own customer interests, the first time they use the system. This involves the validation of the card, followed by check to see if they have used the system before. If it is the first time, the client version presents a number of questions on a visual display for the customer to select with the pointing device.

Once they have selected at least one customer interest, the client version 102 of the central processing system will select a docked barcode reader 106, and download to the reader's memory, the products that are of interest to that customer only. This reduces the list of products so it will fit on the amount of memory on the reader, and reduces the initial download time. After preparing the products of interest for the customer for the first time, the software employs techniques to store and maintain permanently the list for the next time the customer uses the system.

Once freed from its docking station, the barcode reader 106 uses loaded software to respond to any barcode read by the customer, and no further interaction is required by the client version of the central processing system until the barcode reader 106 is returned to one of a plurality of docking stations.

When the barcode reader 106 is returned to a docking station, the client version software will receive the list of products scanned by the customer, for analysis within the supermarket, and for immediate reference should the customer have any queries. A further function can be provided in the software to print a detailed report of the nutritional information and customer interests associated with the products scanned by a customer.

2. Networked Central Client System

Figure 4:
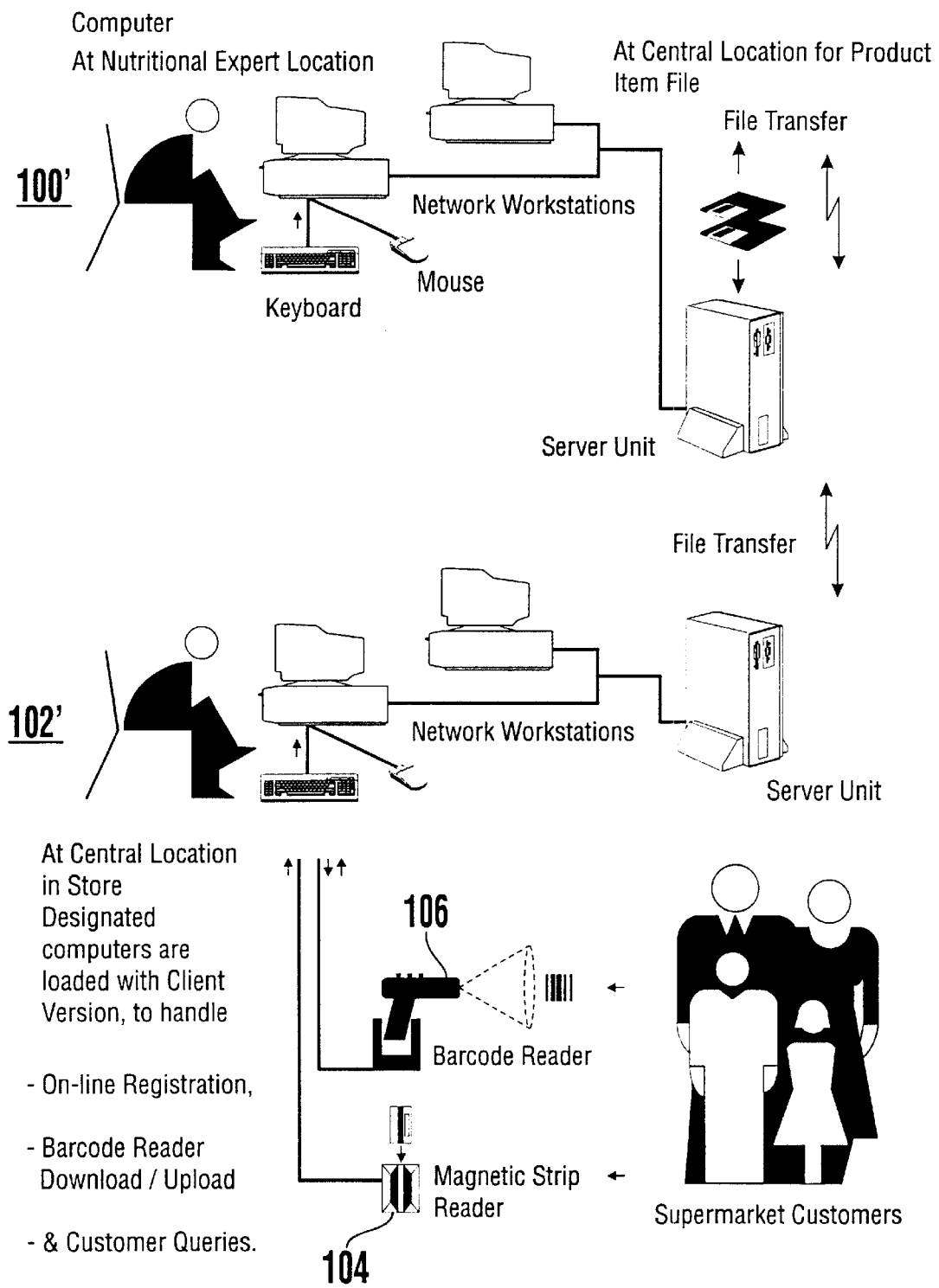

In the next example of system, shown in FIG. 4, the supermarket chooses to implement client versions 102' on computers connected together in a local area network in the shop. Each client version shares the same database files for processing customer requests in the shop. Connection to a central database site or other sites is administered outside of the system. In this implementation, the extraction of information from system files, and the import of information into its files, is performed as part of a scheduled batch process by other application software used in the shop.

3. Server System

Figure 5:
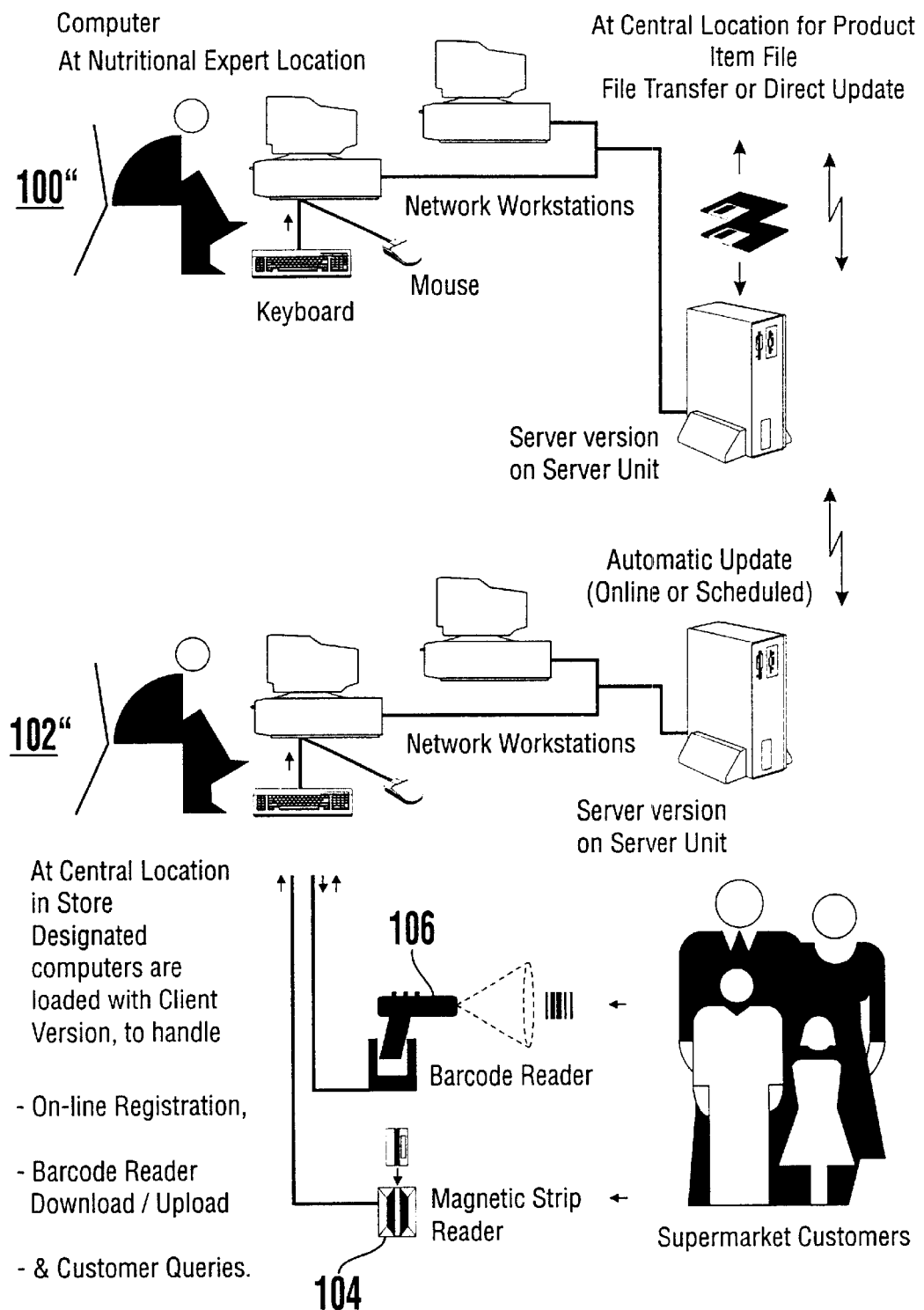
Figure 6:
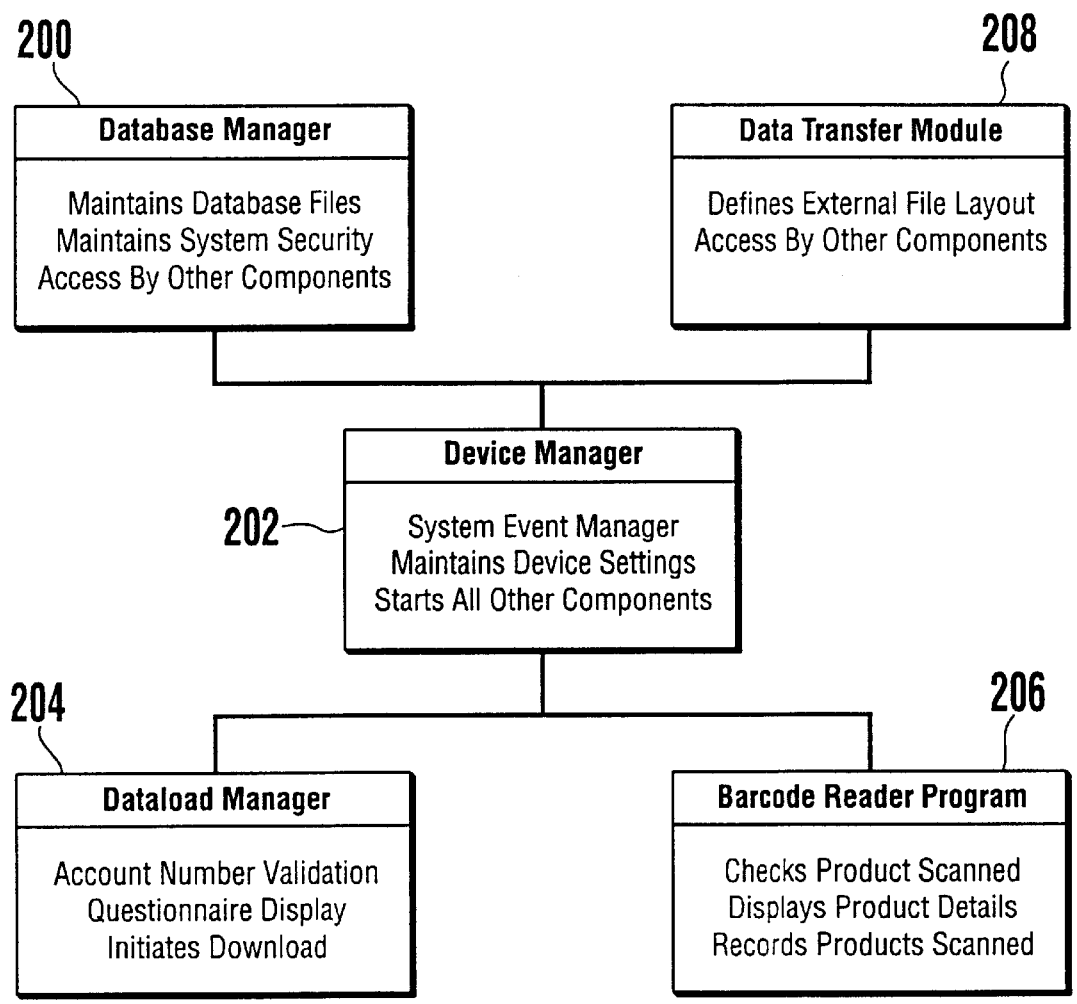
FIG. 6 is an embodiments of the principal components of a central processing system.

In the third example, shown in FIG. 5, the supermarket chooses to implement client versions 102" on computers connected together in a local area network. Each local area network in a shop is also connected to other local area networks by dial-up phone access or by dedicated lease lines. Client/Server software is already deployed to manage the transfer of data from one site to another. In this case, a server version 102" is installed on an application server in the shop, to send and receive information automatically between sites, and to maintain the database files in the shop for other client versions or components. Known advanced database file replication techniques can be used to distribute information, if Oracle™ or latest versions of Microsoft SQL Server™ are deployed.

Product Component Design

The individual product components of the preferred embodiment can be stated with their role and relationship between each other. Reference is made to the block diagram of FIG. 6 which shows the principal product components.

(1) Database Manager 200

Software provides permanent records of customer interests, product details and software settings for fast and quick access at critical points in the use of the system. This product component is used by the nutritional experts in the supermarket company to set-up the information in the first place, and to maintain the information when required. It provides the set-up of access rights to the information for other staff using the system, since security may be an important issue for the supermarket company. It also provides the set-up of database parameters for the support of different database file formats and methods of access expected by each supermarket company.

It is envisaged that the product component will consist of a number of visual look-up database tables, with selection buttons on screen to view, edit or delete individual records in each of the tables. In one of the displayed forms, the operator is able to select the type of database file format for the tables, the OEM parameters for accessing the files, and the system passwords which provide functional access.

In addition to the visual forms, there will also be a library of function calls to read and write the database information to and from other product component software. In this way, each other product component does not need to know the specific details of the database tables used, and changes made to the database structure will only need to be carried out in this Product Component.

When a customer uses the system for the first time, a sequence of visual forms may be used so that the customer can select their human interests. This product component will also provide for the set-up and layout of the forms displayed to the customer, since the content of the forms will be decided by the supermarket company.

In the design of the database, special care is taken not to limit the number of human interests which may be stored against a product and the number of human interests that the customer can select, moreover the supermarket is able to define the human interests and specific order of displayed interests in the database without cause to change the software. Each human interest can contain a range value or values to be displayed to the customer.

The term "human interests" is intended to denote more than just product ingredients. For example, the range of human interests for a particular customer may include allergies to one or more particular food ingredients, desire to avoid or have particular ingredients or type of ingredient, such as carbohydrates, fats, sugars and the like. It may also include foods prepared according to certain religious or other dietary criteria, such as Kosher, vegetarian, vegan foods and the like. "Lifestyle" interests may include foods of particular origin, production methods, foods which are the subject of health questions such as salmonella or BSE. The intention, thus, is to provide more than just an indication of composition of the food product by ingredients.

Care is taken in the design of the database to optimise the speed of retrieval of product details at the point of download to the barcode reader 106. Given tile potential for international sales of the system, the method used to store text in the database makes it easy to provide information for multi-language display in all product components.

In order to use the application database manager 200, the operator is provided with a keyboard and pointing device, or access to the information through another product component. Information stored using this product component will be in proprietary database file format, or Windows™ configuration file format (.INI files). When a member of staff runs the client or server version of the system, this product component will be loaded into computer memory, ready for use. More specific details of the Database Manager are given below.

(ii) Device Manager 202

Software provides the set-up of hardware/software component parameters for the smooth implementation of the system with different expected requirements for barcode readers, magnetic card readers, computers, visual displays, printers and operating systems. Although a Windowsυ operating system will provide direct support for many computer devices, special software may be needed to manage the communication and set-up of barcode and magnetic card readers, using for example the ASYNC Plus 2™ software library (produced by Turbopower Software Company, 4775 Centinnal Boulevard, Colorado Springs, Co. 80919, U.S.A.).

It would also be advisable to provide functions within this product component to recognise automatically all the devices on the workstation/server, and to record their details, so that this can be provided to other product components which require the same information. It is envisaged that the device manager 202 will consist of a number of visual forms which list the devices on the workstation/server and their settings. When experiencing problems with a device, an operator can use this product component to adjust the settings of the device in the list displayed to resolve them. It will also provide the front screen for the system from which an operator can start all other product components residing on the same computer. It also manages the processing time given to each of the product components.

In order to access the device manager 202 settings, the operator is provided with a keyboard and pointing device, and an appropriate password provided by the database manager 200.

When a member of supermarket staff runs the client/server version 102 of the central processing system, this product component is loaded into computer memory, it displays the visual front screen to the system and it loads the database manager 200 into computer memory.

(iii) Dataload Manager 204

Software is provided to manage the interaction of the customer with the system at the point of entry into the system and at the point of return of the barcode reader 106. When a customer enters into the system, the dataload manager 204 validates a customer's account number, passed to it by a magnetic card reader, decide whether to present the customer with a questionnaire, if it is the first time he/she has entered into the system, and subsequently manages the download of product details to the barcode reader 106, ready to take around the shop.

When the customer returns a barcode reader 106 to a cradle or dock of the system docking station, the dataload manager 204 manages the transfer of the product codes scanned by the customer to the database manager 200, so that a permanent record can be made of the entries made by the customer, for any queries the customer may have and for market research purposes. Each time, the dataload manager 204 receives an entry from a customer, the customer account number is used to identify the use of a specific barcode reader 106, so that at the point of return, the dataload manager knows which customer is returning the barcode reader 106. In this way, a list of current barcode readers 106 in use can be maintained in the dataload manager 204, and the system can cope with the use of more than one device in the shop.

The dataload manager 204 calls the database manager 200 and device manager 202 to perform database access and device communication. In this way, the dataload manager will be device independent, and should the database or devices change, then the dataload manager 204 will not need to be changed. It is envisaged that the dataload manager will consist of a number of entry forms for multi-language display and filling in a questionnaire, and the display of account card recognition, download progress and any background marketing information required for promotions on a visual display unit.

While waiting for customers to fill-in questionnaires, or displaying marketing information, the dataload manager 204 will monitor barcode reader returns, and upload the product codes scanned by the customer using calls through the device manager 202. It will then write the information to database tables with the customer account number using the database manager 200.

Both the filling-in of the questionnaire and the display of progress and the like are options which can be switched-off. This allows dedicated network computers to be used for the dataload manager 204, and other network computers to be used just for entering and displaying information. It is envisaged that these options can be decided per installed copy of the system in the device manager against the visual display parameter options. In order to use the dataload manager 204, the operator will require a magnetic card reader and a barcode reader. A pointing device will be required to start the dataload manager, and to use the visual display elements, if they are switched on.

The dataload manager 204 is not loaded into computer memory until selected by the operator from the front screen displayed by the device manager 202.

(iv) Barcode Reader Program 206

In order to drive the barcode readers 106, a specific program is provided for each unit. The program resides on the barcode reader 106, with the purpose of managing the download and upload of data to the device manager of the system. Using the program on the reader, the customer can scan product barcodes, and find out whether the products are inadvisable to purchase given their human interests, or that their is no relevant information for the products. Although the system has been designed to highlight allergies, special diets and lifestyle choices, the supermarket may define many other topics of interest such as special offers and the like. When human interests are found for a scanned product, the program 206 scrolls the text for interests in the display of the barcode reader, until the customer performs another action on the reader. An initial audible tone is given if available on the reader 106 when a selected product is inadvisable.

In order for the program 206 to provide product information to the customer, it stores in the barcode reader memory a product item file, and just the details of those products which are of interest to the customer. In this way, the amount of memory used is reduced to a minimum. Further use of a file containing all the text to be displayed in a specified language reduces the amount of memory used, and the two techniques combined also reduce the time taken to download information into the barcode reader 106.

When the barcode reader 106 is returned to a cradle, the program 206 will upload the product codes scanned to the device manager 202 software running a connected computer. In order to keep a track of who is using which reader, the customer account number is downloaded and uploaded with product information by the program and the device manager 202. The program 206 is automatically started when the barcode reader 106 is turned-on, and after the barcode reader operating system is loaded.

(v) Data Transfer Module

This component manages the flow of information to and from external database sources of information. It is recognised that for many supermarkets, there is already nutritional information and product item details stored and maintained in other computer systems. In the initial set-up of database information, and thereafter to lesser extent, it is envisaged that software is required to import and update product and customer information electronically.

The Data Transfer Module 208 provides visual display forms to the operator to define the layout of information in external data sources to the system. It also provides the ability to schedule the import of this information. Likewise, the module can use the same layouts to schedule the export of information from the database files maintained by the system. When an import or export job is defined by the operator, the Data Transfer Module 208 writes the job details to the configuration file of the device manager 202 component.

At the appointed time of a data transfer job, the device manager 202 component will call functions in the database manager 200 to import or export the information required. As the dataload manager 204 may be loaded at the same time, the device manager 202 carries out primary tasks in the dataload manager 204 first, until sufficient processing time is available to carry out an individual record read or write. In this way, data transfer jobs do not adversely effect dataloading to and from the barcode readers 106.

Connectivity to remote sites and all data sources are provided by the operating and networking software which the computer has loaded. Initially, selective criteria for imports and exports will be defined externally to the Data Transfer Module 208 by the source or target application software.

In order to use the Data Transfer Module 208, the operator is provided with a keyboard and pointing device with the appropriate password provided by the Database Manager 200.

Database Manager, Practical Example

The Database Manager of the preferred embodiment maintains all the database files used by the system and provides a number of visual forms on screen for an operator to maintain the files. It allows the operator to design the layout of a customer questionnaire displayed on the screen when customers enter into the system for the first time. Using the questionnaire, the customer can select the food products he/she wishes to avoid. The Database Manager 200 also provides all the functions to the other software components described above to access and maintain database files and special formatted files used in downloading customer interests to barcode readers.

Figure 7:
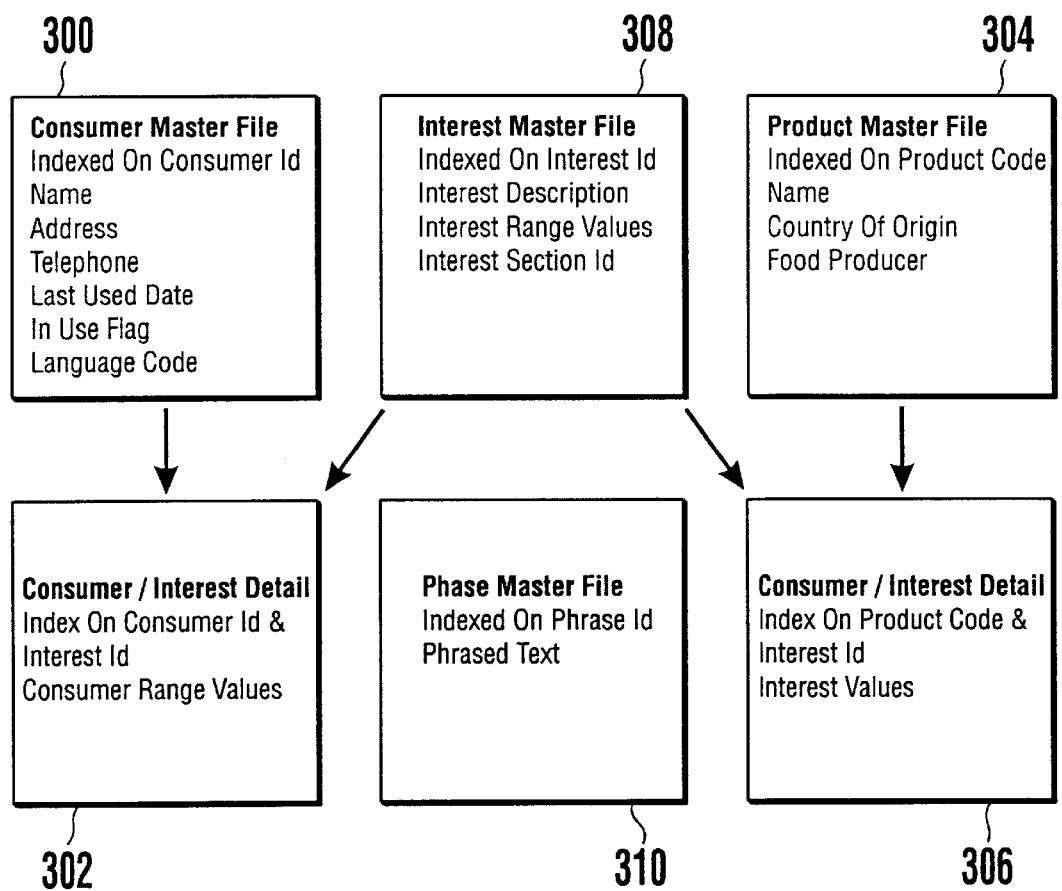
FIGS. 7 to 11 are examples of software items for both the central processing system of FIG. 6 and for the hand-held reader of FIG. 1.

The preferred relational database structure maintained by the Database Manager 200, shown in FIG. 7, allows direct access to any number of interests associated with a customer, and any number of interests associated to a product. In this way, the Database Manager 200 can retrieve the products which a customer is interested given the customer identification (typically a customer account number).

FIG. 7 shows six database files used in this embodiment to maintain the relationship between customer, product and interest details. In each master file, an item is only referenced once by a unique key. In the case of the consumer master 300 file, each consumer registered in the system will be uniquely identified by an account number, and by a second key the consumer name is used to search for the consumer when required. Against the consumer account number and name are fields which store the consumer address and any other personal details required by a supermarket to identify that person.

A Customer Interest Detail file 302 is used to store all the human interests for each individual listed in the Customer Master File 300. The Database Manager 200 finds all human interests in the Customer Interest Detail file by finding the first customer interest with the customer account number, and reading all the following records with the same customer account number. Since the customer account number is an indexed key in the detail file 302, all the human interests for a person will be sorted together in sequence to provide fast retrieval.

In the Product Master file 304, all the food products listed in the database are identified by unique product codes used in the supermarket. This is preferably the same code as the barcode used on the food product packaging. The Product Interest Detail file 306 lists all the human interests associated with each individual product. As one of the indexed keys for the detail file 306 is the product code, the Database Manager 200 retrieves all the human interests for a product by finding the first one with a product code value, and reading the following records until the product code value changes. Against each interest record for a product, a value can be stored for comparison.

Central to the database structure is the Interest Master file 308. The Interest Master file 308 stores a limited but large number of unique human interests by a short numeric code. For each interest stored in the file, the user can store range values for comparison with actual product values for the same interest. There is also a field to store the section where the human interest appears in the customer questionnaire. A short description is used to look up a human interest, rather than search for it by the short numeric code. A human interest can be any item of interest to the customer, it can be a range value, a specific ingredient, a range of ingredients, or a lifestyle choice. As a human interest is stored in the Master file 300, the same numeric code and description is stored in another Master file, the Phrase Master file 310.

The Phrase Master file 310 is used to display all text required in the system including human interest information. A Phrase Master file 310 is maintained for each language required in the system. The numeric codes are the same in each of the Phrase files 310, the only difference being that the text is translated for each language. In this way, the text displayed in the system can be changed for each language by closing the current Phrase Master file 310, and opening the Phrase Master file for that language. For example, if it is wished to store the phrase 'yellow liquid' in the Phrase file 310. The English Phrase Master file 310 may contain a unique number value 1 to identify the phrase text 'yellow liquid'. To display the french equivalent of 'yellow liquid' there will be a French Phrase Master file 310 which contains a record with the unique number value 1 and the translated phrase text for 'yellow liquid' the words 'liquide jaune.'

Since both the English and French Phrase Master files would refer to the phrase with the same unique key number, the system can display English or French text by accessing the files with the same key number value.

Database Preparation

Before any customer registration in the system, nutritional experts in the supermarket company will need to setup the Human Interest Master file 308, the Product Master file 304, the Product Interest Detail file 306, the Phrase Master files 310 for the languages required for interest descriptions and any other text displayed on screen, and tile layout design of the customer questionnaire. In order to achieve this simply and to use existing computer information wherever possible, the Database Manager 200 has visual entry forms and functions based around tile following recommended approach:

1. Type in all new human interests intended for use in the system. The Database Manager 200 will then automatically generate the unique numeric code for each interest and create the corresponding phrases in the Phrase files 310 from the type d description given for each interest.

2. Design the layout of the customer questionnaire based on the human interests created. This will involve the selection of section titles, text displayed on the questionnaire and the selection of the order of the human interests in the sections.

3. Load the food product records in the Product Master file 304 from the supermarket product item file using the Data Transfer Module 208, described above.

4. Load the product details containing human interests using the same Data Transfer Module 208, or type the interests that apply to each product using the Database Manager 200. This applies to new human interests which may be created, once the database is in use.

Once these 4 steps have been achieved the database will be ready to receive new customer registrations. The specific design of database functions are described next in this section.

Database Functions

In the event that there is a major change to the Food Product Database 304, such as new human interests or new products are introduced into the database, or a customer wishes to question the information presented by the system, or wishes to change interest selections, the Database Manager 200 provides visual entry screens for manual update of the human interests, product details and customer details which may be used by staff in the supermarket company. This may be limited to access to the customer questionnaire for staff in the shop, or full access to the database files for use by nutritional experts.

In addition, automated processes may be used in the Database Manager 200 to maintain referential integrity between related database files, and to distribute database changes to other sites using the database.

There are relationships which need to be maintained between the Customer Master file 300, the Customer Interest Detail file 302, the Interest Master file 308, the Product Master file 304 and the Product Interest Detail file 306.

Record Deletions

Referential integrity will only be broken when a deletion occurs, as the Database Manager 200 automatically generates the numeric codes for interest Ids, and all other critical keys are protected from change by the Database Manager 200. In the event that the supermarket wish to delete details from the database, the Database Manager 200 must also perform deletes from the following records:

| Type of delete | Required Automatic Delete Actions: |
| --- | --- |
| Delete a Customer | Delete all customer interest detail records matching customer code, |
| | Delete all customer product detail records matching customer code, |
| | Delete customer master record |
| Delete a Product | Delete all product interest detail records matching product code, |
| | Delete all customer product detail records matching product code. |
| Delete a Human Interest | Delete all customer interest detail records matching interest Id., |
| | Delete all product interest detail records matching interest Id., |
| | Delete phrase record matching interest Id. in each phrase language file, |

| Type of delete | Required Automatic Delete Actions: |
| --- | --- |
| | Delete human interest master record. |

New Records

With the exception of new customer registration, which is a specific database function, the Database Manager 200 performs a number of additions to the database files as follows:

| Type of Addition | Required Automatic Add Actions: |
| --- | --- |
| Add a new Food Product | Validate product code |
| | Add product master record |
| | Add product interest detail records |
| Add a new human interest | Validate questionnaire section |
| | Validate range values |
| | Add interest master record |
| | Add phrase master records |

In order for a food product to be added to the database, a valid product code as used in the supermarket company is used. An external validation routine will be called by the Database Manager 200 to check the product code. At the same time as the product master fields are filled-in, the operator can select the human interests associated with the product from the interest master file. The selected number of product interests will only be limited by the number of human interests which are available.

When the operator decides, the Database Manager 200 writes the product master record to the Product Master file 304, and writes each of the human interests selected as an individual record to the Product Interest Detail file 306.

In order for a new human interest to be added. The Database Manager 200 Generates the next unique interest number by retrieving the first record in the Interest Master file 308, and adding one to it. Immediately, if there already exists a record in the Interest Master file 308 with the same number, it will add one to interest number and attempt to add the record again to the Interest Master file 308. The Database Manager 200 continues to repeat the exercise, until it has successfully stored the new interest master record with a unique number. This ensures that no other Database Manager version running at the same time will clash with the current process.

Once the master record is stored, the Database Manager 200 uses the same interest number to add a record to each of the phrase language files used by the supermarket. The phrase text is taken from the description typed by the expert for the human interest.

If range values are selected for the human interest, the Database Manager 200 stores a reference to a unit phrase already stored in the Phrase Master files 310. If the expert types new unit text for the interest which does not exist in the Phrase Master files 310, the Database Manager 200 generates a unique phrase number to store the unit text, and it references the phrase number us ed in the interest master record. An example of unit text will be 'grams per 100 grams'

New Customer Registration

Figure 8:
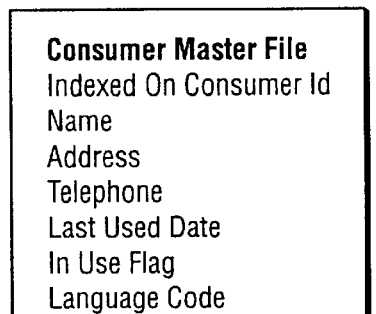
Figure 8:
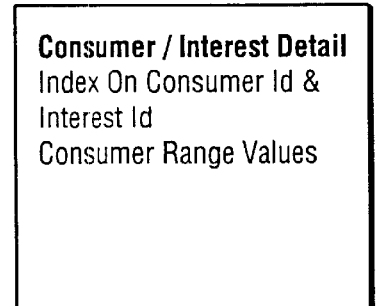

At the point when a new customer is registered into the system, the Customer Master file 300 fields are filled in for the customer, and a customer questionnaire displays on a visual display with the current human interests listed in the Interest Master file. This is shown in FIG. 8.

Once the operator completes the questionnaire, the system stores the selected interests in the Customer Interest Detail file 302 with the customer account number and interest numeric codes (id.). The system is then ready to create a list of all the products which contain the same interest numeric codes.

The system also allows for records to be updated, for example on the introduction of new products, new human interests, altered customer interests. Similarly, if more information becomes available table to the supermarket about a product, it may wish to update product details as well. This can be summarised as follows:

| Type of Update | Required Automatic Update Actions: |
| --- | --- |
| Update Customer details | Update customer master record |
| | Delete customer interest detail records |
| | Add customer interest detail records |
| Update Product details | Update product master record |
| | Delete product interest detail records |
| | Add product interest detail records |
| Update Human Interests | Update interest master record |
| | Update phrase master records |
| | Add new unit text to phrase master records |

In order to update customer details, the Database Manager 200 retrieves and displays the current customer master record, with the current customer interest detail records. The operator can change any of the details, except for the customer account number. The Database Manager 200 preferably deletes all customer interest detail records, before inserting new ones, to ensure referential integrity.

Download to Barcode Reader

Figure 9:
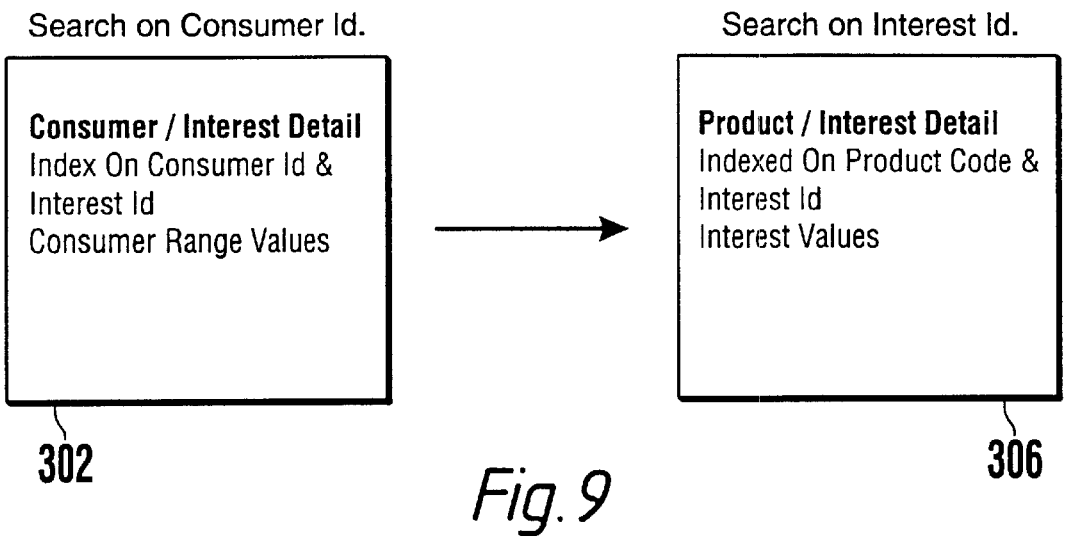
Figure 10:
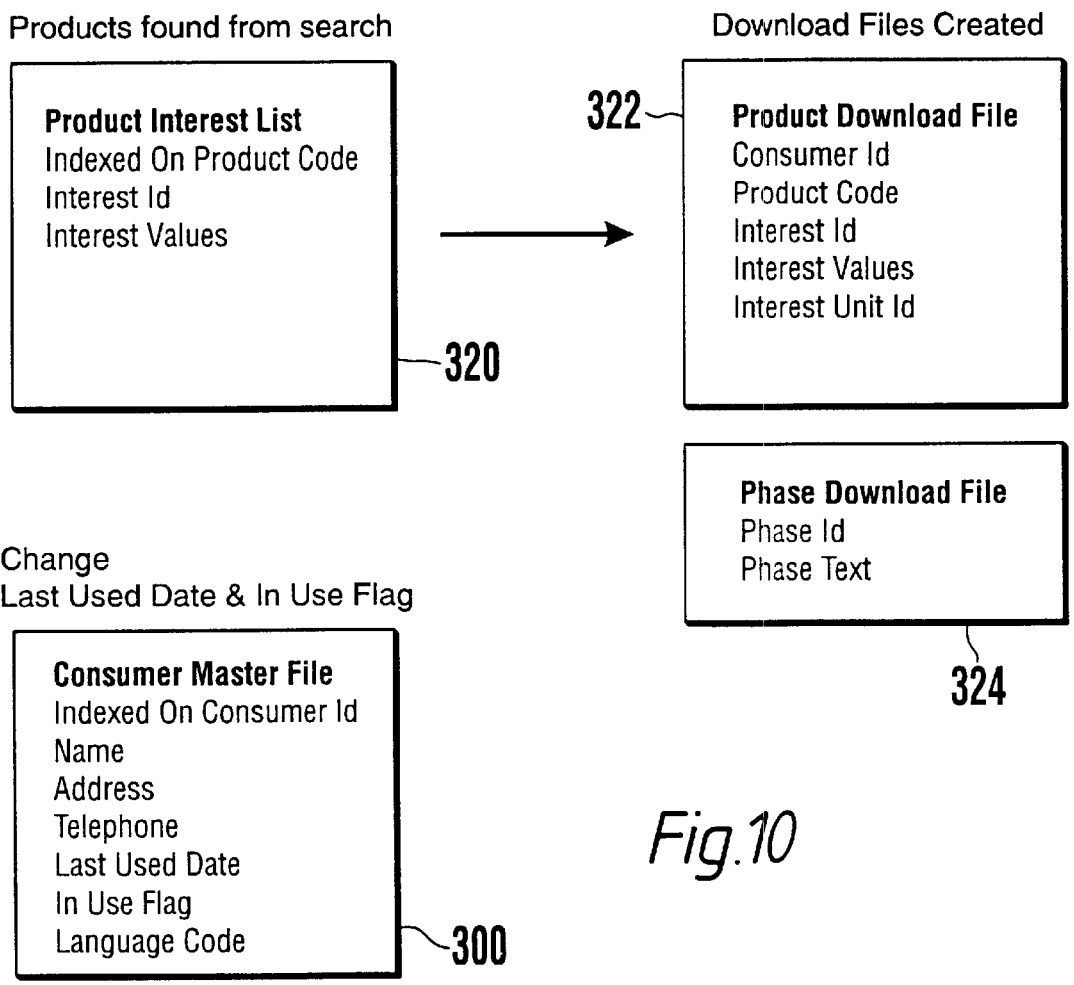
Figure 11:
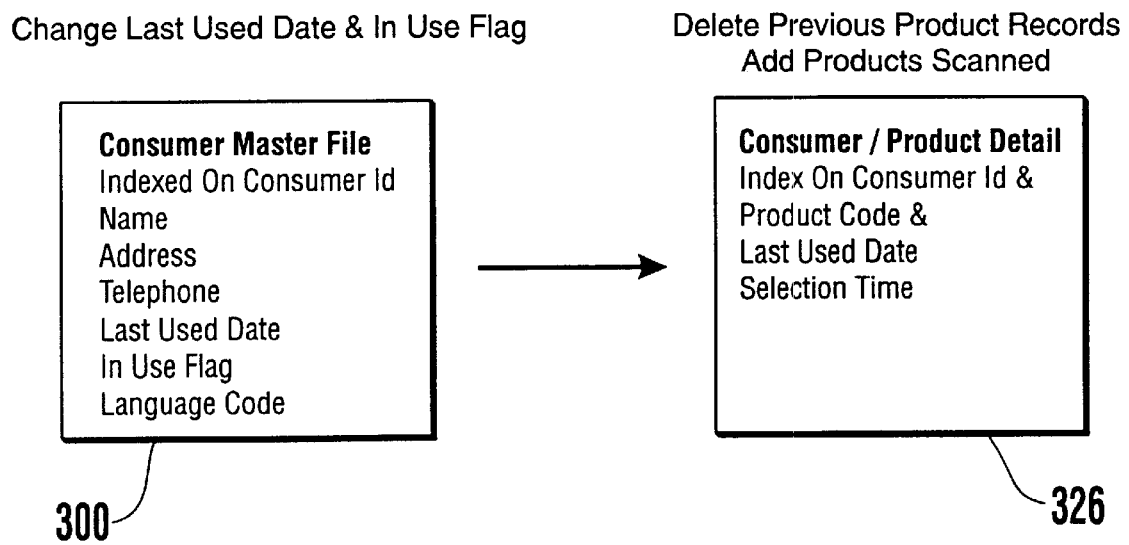

At the point when the system needs to compile the products which contain the customer's human interests to a barcode reader 106, the Database Manager 200 searches and gathers all the human interests listed by the customer from the customer interest detail file 300 given the customer account number. This is illustrated in FIG. 9.

It then searches the Product Interest Detail file 302 for each gathered interest, using the interest numeric code field. Each product interest record found is stored in a temporary list 320 (FIG. 10) in computer memory sorted on product code value with the interest details. Where the same product is found more than once, the different interest details are appended to the same product code in the temporary list. Once all the products have been retrieved from the Product Interest Detail file 306, permanent records of the Product list 320 can be made to speed up access to the details for future access, ready for the file contents to be downloaded to the barcode reader 106.

Once the Download files 322, 324 (FIG. 10) are prepared, the Customer Master file 300 is updated for the customer record to note that a barcode reader 106 is in use by that customer. The file layout of the Download files 322, 324 is designed specifically to fit into the small amount of memory expected on the barcode reader 106, and to reduce the time taken to download the files to the barcode reader 106. For a customer with 5 human interests, and a 1000 food products with these interests, the Database Manager 200 will need to make 5 reads of the Customer Interest Detail file 302, 5 reads of the Interest Master file 308, 10 reads of a Phrase Master File 310, 1005 reads of the Product Interest Detail file 306, and 1 read of the Customer Master file 300. In total, 1026 record retrievals.

This figure excludes duplicate reads of the Product Interest Detail file 306 where two interests share the same product. Retrieval time will be effected by the small record size of the Product Interest Detail file 306, the fact that most of the reads are getting the next record, and the large number of records in the file. An acceptable target speed is considered to be between 5 and 10 seconds.

The Download File structure 322, 324 for the reader will consist of a variable length indexed file to reduce the amount of storage space required on the reader to hold all the product records required, and to reduce download time to the scanner from the central location point (see FIGS. 3 to 5.

Preferred Download Product File Structure:

| | Field or record size in bytes | | |
| --- | --- | --- | --- |
| Field & Record Description | Minimum | Maximum | Type |
| Banner Record | 24 | 54 | |
| Customer Account Number | 20 | 50 | Alpha |
| No of Product Index records | 4 | 4 | Number |
| Product Index Records | 17 | Calculated | Alpha |
| Product Code | 12 | 20 | Alpha |
| Interest Location | 4 | 4 | Number |
| No of Interest Records (1..254) | 1 | 1 | Byte |
| Interest Records | 6 | 1524 | |
| Interest Id | 2 | 2 | Word |
| Value | 2 | 2 | Word |
| Unit Phrase Id | 2 | 2 | Word |

Minimum File Size for 1 Product, 1 Interest: 47 Bytes
File size for 1000 products. average 5 interests: 47024 Bytes
(Download Rate of 9600 Baud, 5–6 Seconds)

In addition to the product file downloaded to the scanner, we will need to download a file containing the text to display for the interest records.

Preferred Download Phrase file Structure:-

| | Field or record Size in bytes | | |
| --- | --- | --- | --- |
| Field & Record Description | Minimum | Maximum | Type |
| Phrase records | 4 | 257 | |
| Phrase Interest Id | 2 | 2 | Word |
| Phrase size | 1 | 1 | Byte |
| Phrase Text | 1 | 254 | Alpha |

Minimum File Size for 1 Product, 1 Interest: 4 bytes
File Size for 1000 Products. average 5 Interests: 2570 bytes
(average size of text 40 characters) (430 bytes)

The downloaded Phrase file will not need to be indexed, as we can expect the barcode reader software to read the whole file contents within a second.

When the customer returns the barcode reader 106 to a cradle linked to the system, the Database manager 200 records the products scanned by the customer with the day s date, and the customer account number. Any previous records of the customer scan of products will be overwritten at this point, so that only the most current details of the customer are held in the Food Product Database 326. This requires the addition of another Database file to the Database structure previously defined, to store the information, shown in FIG. 11.

In an embodiment, the customer is presented with a report of products considered for purchase.

It will be apparent from the above, that the system can also be used by a supermarket to monitor customer behaviour, for example by determining which products were checked by a particular customer through the barcode reader 106, how that customer passed through the shop and so on. This can be achieved readily by an appropriate memory in the reader 106 and appropriate processing software in the central processing system of the shop.

What is claimed is:

1. A product selection system for advising a user comprising: a product database having user preference data corresponding to a plurality of products; a means for selecting a particular product listed in the product database; a means for matching the user preferences with each one of the plurality of products; a means for generating a sub-database having data corresponding to the plurality of products matching the user preference, the sub-database residing within a mobile user device, and wherein the product database includes predetermined characteristics of each product, one or more of the characteristics being unrelated to the ingredient content of the particular product; and a means for advising the user to select the product if the selected product has one or more of the predetermined characteristics specified by the user in the sub-database.

2. The product selection system of claim 1, wherein the characteristics of the product include at least one of a member selected from a group consisting of method of treatment, method of manufacture, distance of travel from origin, place of origin, politics of region of origin, type of labor used in manufacture and production, details of manufacturers details of supplier, details of health risks, details of public health warnings associated with the product, details of special offers.

3. The product selection system of claim 1 or 2, wherein the system includes means to explain to the user the reasons for advising.

4. The product selection system of claim 1, including a central processing station wherein the product database resides, and at least one mobile user device.

5. The product selection system of claim 4, further comprising a means for programming at least one of the mobile user devices by the central processing station so as to contain a part of the product database relevant to the user.

6. The product selection system of claim 1, further comprising a means for reading a barcode and a means for identifying a selected product from the barcode thereon.

7. The product selection system of claim 1, further comprising a means for monitoring products considered for purchase by the user.

8. The product selection system of claim 1, further comprising a means for monitoring products considered for purchase by user.

9. The product selection system of claim 1, wherein the characteristics of the product includes at least a method of treatment.

10. The product selection system of claim 1, wherein the characteristics of the product includes at least a method of manufacture.

11. The product selection system of claim 1, wherein the characteristics of the product includes at least a distance of travel from origin.

12. The product selection system of claim 1, wherein the characteristics of the product includes at least a place of origin.

13. The product selection system of claim 1, wherein the characteristics of the product includes at least a politics of region of origin.

14. The product selection system of claim 1, wherein the characteristics of the product includes at least a type of labor used in manufacture and production.

15. The product selection system of claim 1, wherein the characteristics of the product includes at least a detail of manufacturer.

16. The product selection system of claim 1, wherein the characteristics of the product includes at least a detail of supplier.

17. The product selection system of claim 1, wherein the characteristics of the product includes at least a detail of health risks.

18. The product selection system of claim 1, wherein the characteristics of the product includes at least a detail of public health warnings associated with the product.

19. The product selection system of claim 1, wherein the characteristics of the product includes at least a detail of special offers.

20. A method of advising a user comprising the steps of: determining user preferences by selecting one or more product characteristics unrelated to the ingredient content of the particular product; identifying a product selected by the user based on a product identifier; determining if the product selected by the user includes at least one of the user selected product characteristics from a product database, wherein the product database has at least one of the product characteristics unrelated to the ingredient content of the product; notifying the user of the results of the determination; generating a sub-database having data corresponding to the products matching user preferences; providing the sub-database to a mobile user device; and advising the user to select the product if the product has one or more of the predetermined characteristics specified by the user in the sub-database.

21. The method of claim 11, wherein said product characteristics include one or more of a number selected from a group consisting of method of treatments method of manufacture, distance of travel from origin, place of origin, politics of region of origin, type of labor used in manufacture and production, details of manufacturer, details of supplier, details of health risks, details of public health warnings associated with the product, details of special offers.

22. The method of claim 11, wherein the characteristics of the product includes at least a method of treatment.

23. The method of claim 11, wherein the characteristics of the product includes at least a method of manufacture.

24. The method of claim 11, wherein the characteristics of the product includes at least a distance of travel from origin.

25. The method of claim 11, wherein the characteristics of the product includes at least a place of origin.

26. The method of claim 11, wherein the characteristics of the product includes at least a politics of region of origin.

27. The method of claim 11, wherein the characteristics of the product includes at least a type of labor used in manufacture and production.

28. The method of claim 11, wherein the characteristics of the product includes at least a detail of manufacturer.

29. The method of claim 11, wherein the characteristics of the product includes at least a detail of supplier.

30. The method of claim 11, wherein the characteristics of the product includes at least a detail of health risks.

31. The method of claim 11, wherein the characteristics of the product includes at least a detail of public health warnings associated with the product.

32. The method of claim 11, wherein the characteristics of the product includes at least a detail of special offers.

* * * * *